United States Patent

Brown et al.

[15] 3,648,149
[45] Mar. 7, 1972

[54] POLYPHASE INVERTER CIRCUIT

[72] Inventors: Harold J. Brown, Lorain; Joseph L. Winpisinger, Fairview Park, both of Ohio

[73] Assignee: Lorain Products Corporation

[22] Filed: Mar. 11, 1971

[21] Appl. No.: 123,349

[52] U.S. Cl. .................................. 321/5, 321/9 A, 321/26, 321/36, 323/48
[51] Int. Cl. .................................................. H02m 7/00
[58] Field of Search ........................ 321/5, 9 A, 18, 26, 36; 323/48

[56] References Cited

UNITED STATES PATENTS

| | | | |
|---|---|---|---|
| 1,746,259 | 2/1930 | Jonas | 321/26 X |
| 2,470,598 | 5/1949 | Biebesheimer | 323/48 X |
| 2,488,628 | 11/1949 | Hoeppner | 323/48 |
| 3,388,310 | 6/1968 | Etter | 321/5 |
| 3,392,319 | 7/1968 | McColl et al. | 321/5 |

Primary Examiner—William M. Shoop, Jr.
Attorney—John Howard Smith

[57] ABSTRACT

A polyphase inverter circuit including a plurality of bridge-commutated inverter networks for providing first and second sets of polyphase voltages. These voltages are applied in power-aiding relationship to respective electrically isolated sets of primary windings on a polyphase output transformer. The instantaneous current through each primary winding is controlled by the algebraic combination of voltages from the inverter networks supplying voltage thereto at that instant. This control results in the cancellation of the third harmonic components of the polyphase voltages supplied to a load.

10 Claims, 8 Drawing Figures

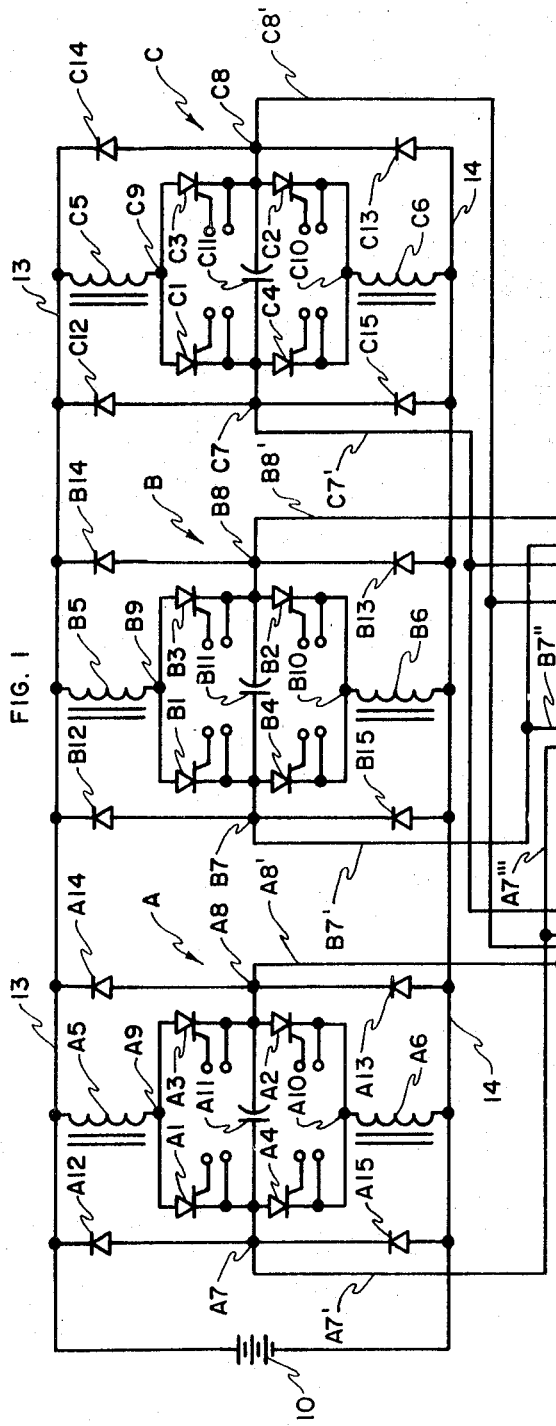
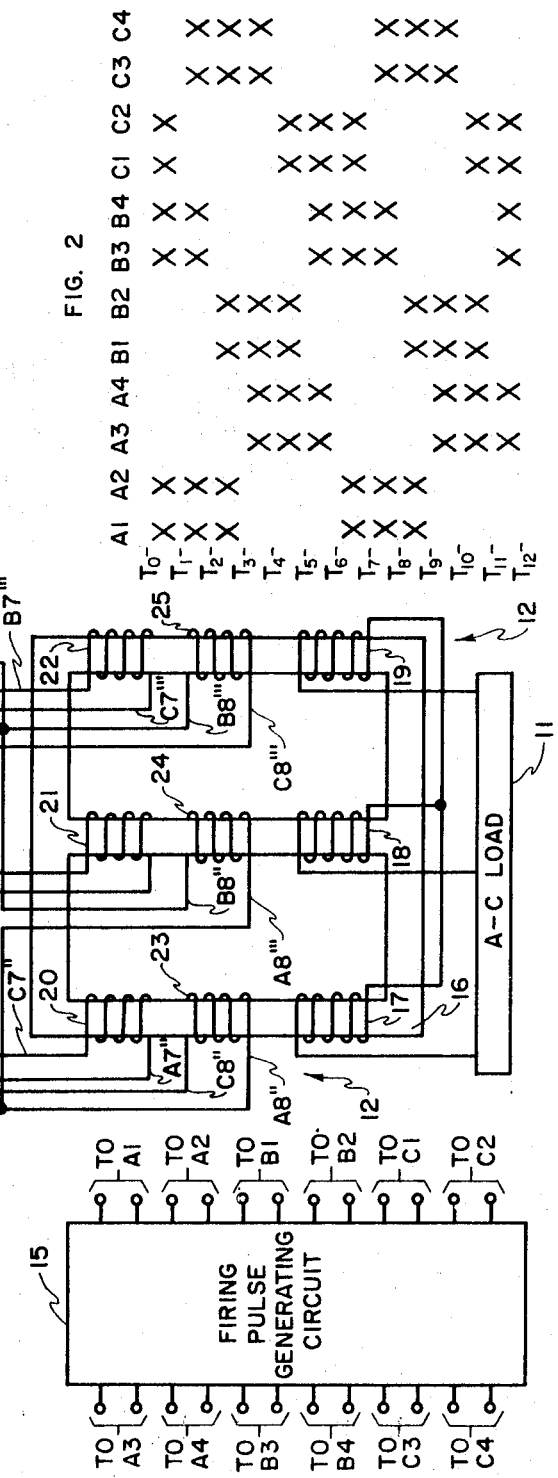

Patented March 7, 1972
3,648,149
3 Sheets-Sheet 2
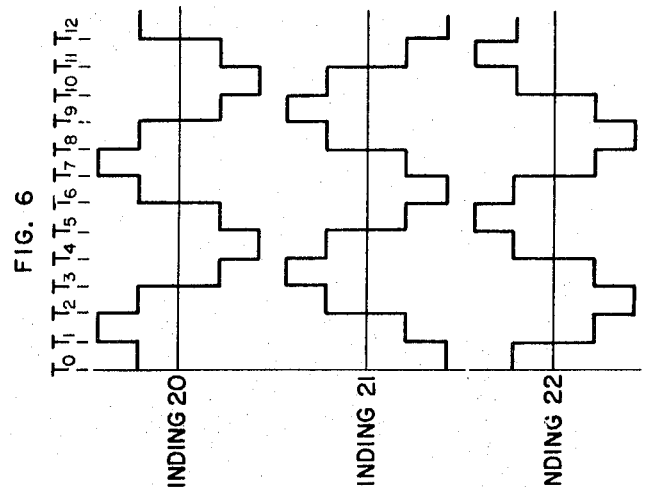
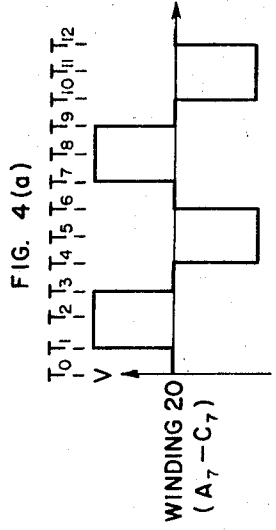
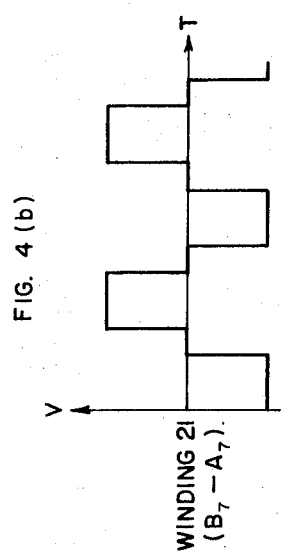
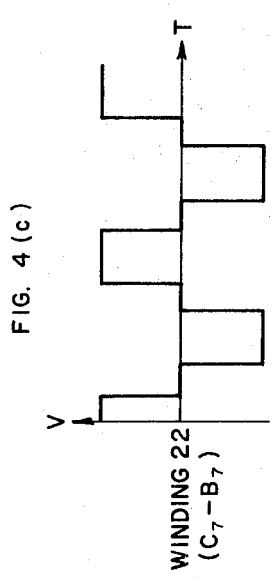
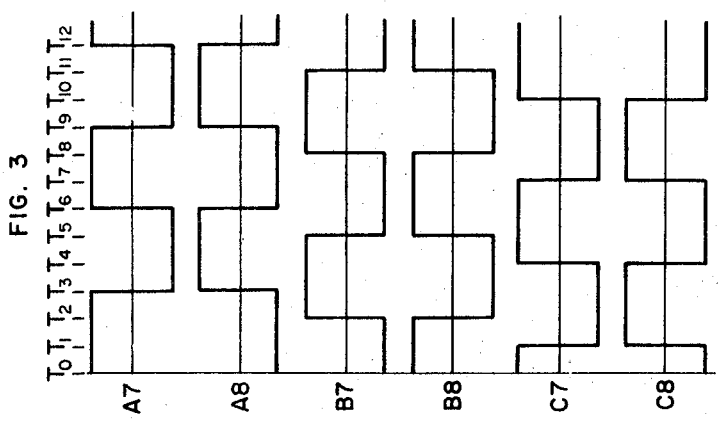
INVENTOR:
HAROLD J. BROWN
JOSEPH L. WINPISINGER
BY John Howard Smith
ATTORNEY.

POLYPHASE INVERTER CIRCUIT

BACKGROUND OF THE INVENTION

The present invention relates to inverter circuits and is directed more particularly to an improved polyphase inverter.

In generating a polyphase AC voltage from a DC source, such as a battery, it is the practice to connect together a plurality of single-phase inverter modules of either the center-tapped source type or the bridge type. These inverter modules generate respective single-phase voltages which are combined into the desired polyphase output voltage in a polyphase output transformer. Both the center-tapped source and bridge types of inverter circuits have serious disadvantages. With the present invention the advantageous features of both types of circuits are realized without the disadvantages of either type of circuit.

One advantage of center-tapped source inverters is that the commutating circuitry must include two capacitors of high capacitance value. Each of these commutating capacitors must have a substantially higher capacitance value than the single commutating capacitor used in a bridge inverter module having an equal power rating. As a result, the commutating circuitry of the center-tapped source inverter is substantially more voluminous and less efficient than the commutating circuit of the bridge inverter.

A second disadvantage of the center-tapped source inverters is that they require a transformer in the commutating circuit while bridge inverters do not. The leakage inductance of this transformer limits the rise time of capacitive discharge current during commutation and, thereby, lengthens the commutating interval to the detriment of the overall effectiveness of the circuit. In addition, the energy stored in the commutating capacitors of center-tapped source inverters must be larger than would be necessary in the absence of the transformer. This is because the commutating capacitor must store energy sufficient to compensate for the losses in the commutating transformer.

The bridge inverter, on the other hand, has the disadvantage that the output terminals of two or more thereof cannot be metallically connected unless the voltages at the connected terminals are in phase. This is because an out-of-phase condition will cause a short circuit to appear across the energizing DC source during those periods when the voltages at the connected outputs attempt to attain opposite polarities. Since this out-of-phase condition is inherent in polyphase circuitry, it is necessary to keep the bridge inverter modules electrically isolated from one another as they energize the primary windings of a polyphase output transformer. Keeping the bridge inverter modules isolated, in turn prevents the third harmonic components of the polyphase output voltages from cancelling each other. As a result, the filter inductors used in the bridge-type polyphase inverters must be substantially larger and more expensive than those used in center-tapped source type polyphase inverters of equal power rating.

Thus, prior to the present invention, it was necessary to choose between a center-tapped source inverter having an expensive and inefficient commutating circuit but requiring a minimum of filtering circuitry and a bridge inverter having unduly large and expensive magnetic units but having a highly efficient commutating circuit. With the present invention there is provided a unique arrangement of bridge-commutated inverter modules, primary and secondary output windings and connections therebetween which allows the utilization of an advantageous commutating circuit as well as an advantageous filtering circuit.

SUMMARY OF THE INVENTION

Accordingly, it is an object of the invention to provide an improved polyphase inverter.

It is another object of the invention to provide a polyphase inverter circuit wherein the advantages of utilizing bridge-type inverters may be attained while at the same time attaining the advantages of center-tapped source type inverters.

It is a further object of the invention to provide an improved polyphase inverter circuit that includes a plurality of what will be referred to herein as bridge-commutated inverter networks. Such inverter networks constructed in accordance with the invention provide load current in the manner of center-tapped source type inverters but commutate in the manner of bridge-type inverters.

Another object of the invention is to provide a polyphase inverter circuit which includes a plurality of these bridge-commutated inverter networks and a polyphase output transformer having two electrically isolated sets of primary windings, each set having one winding on each leg of the output transformer. The outputs of each bridge-commutated inverter network are so connected to each of the sets of primary windings that substantially no third harmonic voltages appear thereacross.

Yet another object of the invention is to provide circuitry so arranged that each half-cycle of current in each phase includes two phase-displaced currents, each of which flows through at least two different bridge-commutated inverter networks. This assures that each current is subject to differential voltage control, the latter being necessary for effective third-harmonic cancellation. By differential control is meant the algebraic combination of voltages in the manner to be explained presently.

A still further object of the invention is to direct the above two currents through respective, electrically isolated pairs of primary windings on the same leg of the output transformer. This assures that these currents maintain a power aiding relationship with respect to one phase of a polyphase load. More specifically, and as a further object of the invention there is provided herein a polyphase inverter circuit including a plurality of bridge-commutated inverter networks, each having two outputs, each output of each network comprising one of a set of outputs with companion outputs of other inverter networks.

DESCRIPTION OF THE DRAWINGS

FIG. 1 is a schematic diagram of an exemplary circuit which embodies the invention.

FIG. 2 is a timing chart showing the conductive states of selected circuit elements of FIG. 1.

FIG. 3 is a timing diagram showing the output voltage waveforms of the various networks of FIG. 1.

FIGS. 4a, 4b and 4c are timing diagrams showing various other voltage waveforms of the circuit of FIG. 1.

FIG. 6 is a timing chart showing the voltage waveforms produced by the circuit of FIG. 5.

DESCRIPTION OF THE INVENTION

Figure 5:
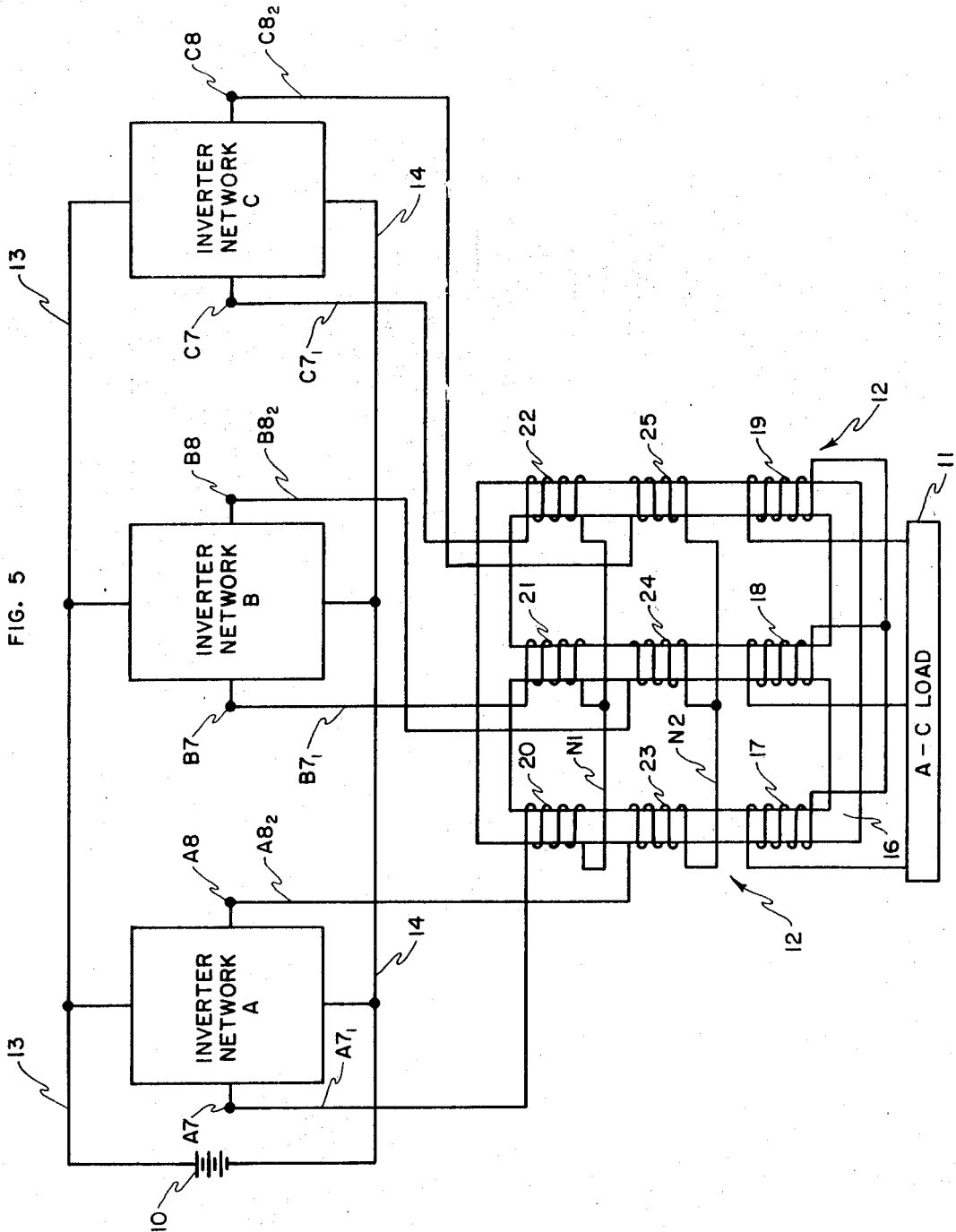
FIG. 5 is a schematic diagram of a modified circuit embodying the invention.

Referring to FIG. 1, there is shown a DC source 10 for energizing a polyphase AC load 11 through the inverter circuit of the invention. In the present embodiment, the inverter circuit includes a plurality of inverter networks A, B and C which generate the single-phase components of the desired polyphase output voltage. The inverter circuit also includes a polyphase output transformer 12 which serves to combine these single-phase components into a polyphase voltage, this being accomplished in an improved manner to afford the advantages of the invention.

Each of the above inverter networks is a two-state switching circuit which connects source 10 to the primary windings of transformer 12 with alternate positive and negative polarities. Each inverter network is made to commutate or switch between its two states by pulses from a gate pulse generating circuit 15. As will be seen presently, this commutation is accomplished in the manner of bridge inverters to afford the advantageous commutating properties thereof.

Inverter networks A, B and C are connected to the primary windings of transformer 12 so that the current in each primary winding flows through and is controlled by at least two different inverter networks. This is accomplished in the manner of center-tapped source inverters to afford the advantageous harmonic cancelling properties thereof. Thus, the circuit of the invention has the advantages of both types of inverters.

To the end that inverter network A may apply positive and negative energizing voltages to the primary windings of transformer 12, controllable switching means which here take the form of thyristors A1, A2, A3 and A4 are connected between positive and negative busses 13 and 14, respectively, by inductors A5 and A6. These thyristors are connected in a bridge configuration having AC output terminals A7 and A8, DC input terminals A9 and A10 and a commutating capacitor A11.

When inverter network A is in a first operative state characterized by the conduction of thyristors A1 and A2, the potential of output A7 is substantially equal to the potential of positive bus 13 to which it is connected through conducting thyristor A1 and inductor A5. This is because the voltage drops across thyristor A1 and inductor A5 are negligible. At the same time, the potential of output A8 is substantially equal to the potential of negative bus 14 to which it is connected through conducting thyristor A2 and inductor A6. Similarly, when switching network A is in a second operative state characterized by the conduction of thyristors A3 and A4, the potential of output A8 is substantially equal to the potential of positive bus 13 and the potential of output A7 is substantially equal to the potential of negative bus 14. Thus, output A7 is positive when output A8 is negative and vise versa.

Inverter network A is commutated, that is, made to switch between its two states in accordance with a periodic succession of firing pulses from a suitable firing pulse generating circuit 15 which may include any of the well-known gate pulse generating circuits for polyphase inverters. These firing pulses are applied alternately and severally to the gate-cathode circuits of the thyristor pairs A1 and A2 and A3 and A4 to initiate periodic reversals in the polarity of the voltages at outputs A7 and A8. The latter voltages are shown in FIG. 3, wherein the voltages are plotted with reference to the electrical midpoint of source 10.

When inverter network A is in its first operative state, that is, when thyristors A1 and A2 conduct, capacitor A11 is charged positive on the left by a current from positive bus 13, through inductor A5, thyristor A1, capacitor A11, thyristor A2 and inductor A6 to negative bus 14. If, under these conditions, pulse generating circuit 15 applies firing pulses to the then nonconducting thyristors A3 and A4, the latter will be rendered conducting. This is because conducting thyristors A1 and A2 act as closed switches through which capacitor A11 applies forward biasing voltages across thyristors A3 and A4. Once thyristors A3 and A4 begin to conduct, thyristors A1 and A2 will be rendered nonconducting. This is because newly conducting thyristors A3 and A4 then act as closed switches through which capacitor A11 applies reverse biasing voltages across thyristors A1 and A2. Thus, when inverter network A is in its first operative state, the application of firing pulses to then nonconducting thyristors A3 and A4 causes inverter network A to switch from its first to its second operative state.

When inverter network A attains its second operative state, that is, when thyristors A3 and A4 conduct, capacitor A11 is charged positive on the right by a current from positive bus 13, through inductor A5, thyristor A3, capacitor A11, thyristor A4 and inductor A6. Under these conditions, the application of firing pulses to then nonconducting thyristors A1 and A2 causes inverter network A to switch from its second to its first operative state, this being accomplished in the manner previously described.

Inverter network A is commutated by capacitor A11 which is connected across the AC terminals of the thyristor bridge comprising thyristors A1, A2, A3 and A4. This type of commutation is known as bridge commutation. Thus, inverter network A is bridge-commutated. Because of the similarity between inverter networks A, B and C, it will be understood that the above description of the commutation of inverter network A is equally applicable to inverter networks B and C.

During the periods when commutation is occurring, inductors A5 and A6 serve as voltage and current buffers between the thyristor bridge and DC source 10. This protects the latter from exposure to excessive transient voltages and currents. Diodes A12, A13, A14 and A15 provide paths for the flow of reactive currents between AC load 11 and DC source 10 when the inverter supplies nonresistive loads.

The time relationships between the conductive states of the thyristors of inverter networks A, B and C are shown in FIG. 2 wherein X's within a time interval such as $T_0$–$T_1$ indicate which thyristors conduct during that interval as determined by the firing sequence of the pulse-generating circuit 15. The resulting time relationships between the output voltages of inverting networks A, B and C are shown in FIG. 3 wherein all voltages are plotted with respect to the electrical midpoint of DC source 10. As is most clearly seen in FIG. 3, each inverter network produces a pair of complementary square wave output voltages each of which is 120° out of phase with the corresponding output voltage of each other inverter network.

As is well known, each of the above square waves of voltage includes a third-harmonic voltage component, that is, a sinusoidal voltage component having a frequency three times that of the square wave. If the outputs of each inverter network were connected across respective electrically isolated windings of a conventional output transformer, so that each inverter network operated as a bridge inverter in driving a respective primary winding (open-phase operation), the above third harmonic voltages would have to be removed by a filter located either between the outputs of the separate inverter networks and the output transformer or between the transformer and the AC load. In such a filter, the inductors must have cores which are substantially larger than would be required if the unwanted third-harmonic components of voltage were not present. Thus, the use of bridge inverters in an open-phase connection requires large and expensive magnetic units.

While polyphase transformers having primary winding connections other than the open-phase connection are not subject the above described harmonic problems, such other connections cannot be utilized with single-phase bridge inverters. This is because any metallic connection between the outputs of such inverters will cause a short circuit to appear across the DC source each time the metallically connected outputs attempt to attain voltages of opposite polarities. Thus, prior to the present invention, it was necessary to choose between a circuit having an acceptable commutating circuit but having unduly large magnetic units and one having magnetic units of acceptable size but having a large and inefficient commutating circuit.

In accordance with the present invention, there is provided an inverter circuit having the advantage of bridge commutation as well as magnetic units of acceptable size. This is accomplished without sacrificing the ability of the inverter circuit to cancel the undesired third harmonic components of the voltages produced thereby. To attain the foregoing advantages there is provided a novel arrangement of bridge-commutated inverter networks together with connections thereof to a power transformer.

In the present embodiment, the foregoing is accomplished by providing a transformer 12 including a three-legged core 16, a set of Y-connected secondary windings 17, 18 and 19 and first and second, electrically isolated sets of delta-connected primary windings 20, 21 and 22 and 23, 24 and 25, respectively, and by connecting the outputs of inverter networks A, B and C to the above primary windings in accordance with the invention.

As will be seen from the drawing, each primary winding of the above-named first set of primary windings is connected between corresponding terminals of different inverter networks. Primary winding 20, for example, is connected between output A7 of inverter network A and output C7 of inverter network C by conductors A7', A7'', C7' and C7''. Accordingly, the current in each primary winding is affected by the voltages appearing at the outputs of both of the inverter networks to which that primary winding is connected.

If, for example, output A7 is at the potential of positive bus 13 (due to thyristor A1 being conducting) at the same time that output C7 is at the potential of positive bus 13 (due to thyristor C1 being conducting), as shown at time $T_0$ in FIG. 3, the ends of winding 20 will be at the same potential and no potential difference (voltage) will appear across winding 20. If, on the other hand, output A7 is at the potential of positive bus 13 at the same time that output C7 is at the potential of negative bus 14, as shown at time $T_2$ in FIG. 3, the ends of winding 20 will be at different potentials and a potential difference will appear across winding 20, this potential difference being equal to the potential difference between busses 13 and 14. More generally stated, the voltage across primary winding 20 is equal to the difference between the voltages at the inverter network outputs to which its ends are connected. The waveform of this voltage is shown in FIG. 4a. FIGS. 4b and 4c show the waveforms of the voltages across windings 21 and 22, respectively.

While the inverter network output voltage waveforms shown in FIG. 3 each include a substantial third harmonic component, the primary winding voltage waveforms shown in FIG. 4 do not. The reason is that each primary winding is energized differentially, that is, by two different inverter networks so that the third harmonic components of the different inverter network output voltages cancel one another but so that the fundamental components thereof do not cancel one another. This is possible because of the previously described 120° phase difference between the corresponding output voltages of different inverter networks.

During those periods such as $T_0$–$T_1$, when inverter networks A and C establish no potential difference across primary winding 20, only negligible current flows through the thyristors of those inverter networks. On the other hand, during those periods such as $T_1$–$T_3$, when inverter networks A and C establish a positive voltage across winding 20, current flows from positive bus 13, through inductor A5, thyristor A1, conductors A7' and A7'', upward through winding 20, conductors C7'' and C7', thyristor C4 and inductor C6 to negative bus 14. Similarly, during those periods such as $T_4$–$T_6$, when inverter networks A and C establish a negative voltage across winding 20, current flows from positive bus 13 through inductor C5, thyristor C1, conductors C7' and C7'', downward through winding 20, conductors A7'' and A7', thyristor A4 and inductor A6 to negative bus 14. Thus, the current through primary winding 21 flows through and is controlled by two different inverter networks. The currents through primary windings 21 and 22 will be understood to flow through similar paths through inverter networks A and B and B and C, respectively.

To the end that the above described second set of primary windings may also be differentially energized by inverter networks A, B and C, windings 23, 24 and 25 are connected between the remaining corresponding terminals of different inverter networks. Primary winding 23, for example, is connected between inverter network outputs A8 and C8 through conductors A8', A8'', C8'' and C8'. It will be understood that the current in primary winding 23 flows through thyristor pairs A3 and C2 and C3 and A2 in the manner described above with reference to primary winding 20 and thyristor pairs A1 and C4 and C1 and A4. As described previously with respect to windings 20, 21 and 22, the connections of windings 23, 24 and 25 assure that the voltages which inverter networks A, B and C establish thereacross have no third harmonic components.

In order that first primary windings 20, 21 and 22 may cooperate with second primary windings 23, 24 and 25 in energizing secondary windings 17, 18 and 19, the primary windings on each leg of core 16 are so arranged that the currents therethrough produce mutually additive fluxes. For example, the current which flows upwardly through winding 20 when thyristors A1 and C4 conduct should produce flux in the same direction as the current which flows downwardly through winding 23 when thyristors C3 and A2 conduct. To accomplish this, windings 20 and 23 are wound in opposite directions around core 16. It will be understood that windings 20 and 23 may be wound in the same direction around core 16 if the connections of either of the windings are reversed.

The circuit of the invention may also be utilized with a polyphase output transformer having first and second Y-connected sets of primary windings. A circuit of this type is shown in FIG. 5 which is similar to FIG. 1, like parts being similarly numbered.

Referring to FIG. 5, it will be seen that first primary windings 20, 21 and 22 are connected together by a common or neutral conductor N1 and are connected to inverter network outputs A7, B7 and C7 through conductors $A7_1$, $B7_1$, and $C7_1$, respectively. Similarly, second primary windings 23, 24 and 25 are connected together by a common or neutral conductor N2 and are connected to inverter network outputs A8, B8 and C8 through conductors $A8_2$, $B8_2$ and $C8_2$, respectively. As described in connection with FIG. 1, these two sets of primary windings are electrically isolated from one another.

Because the different outputs of each inverter network are connected to respective, electrically isolated sets of primary windings, the current from positive bus 13 which flows out of any inverter network output has no path to negative bus 14 through the other output of that same inverter network. Instead, the above current must flow to negative bus 14 through the outputs of one or more different inverter networks. The current from positive bus 13 which flows out of inverter network output A7, for example, will flow through winding 20 to neutral conductor N1 and then, depending upon the instantaneous conductive states of the thyristors in inverter networks B and C, flow to negative bus 14 through inverter network outputs B7 and C7 or both. Thus, each primary winding is differentially energized, that is, energized in accordance with the operative states of two or more different inverter networks.

The waveform of the voltage across each of the above primary windings is dependent upon the net flux in the respective leg of core 16. The latter is, in turn, dependent upon the fluxes produced by the remaining primary windings. We have found tHat the above fluxes interact so as to produce the voltage waveforms shown in FIG. 6. While these waveforms are different from those described previously with reference to FIG. 4, they are equally free of third-harmonic voltage components. Thus, the circuit of FIG. 5 has harmonic cancelling properties similar to those described in connection with the circuit of FIG. 1.

From the foregoing, it will be seen that the current through as well as the voltage across each primary winding is differentially controlled, that is, controlled by the combined activity of different inverter networks. Prior to the present invention, the harmonic cancelling advantages of differential control have been attained only in circuits utilizing inverter networks of the center-tapped source type. In addition, inverter networks A, B and C are commutated by means of capacitors which are connected across the AC terminals of the thyristor bridges included therein. Prior to the present invention, commutating advantages of bridge-commutation have been attained only in circuits utilizing bridge inverters. With the circuit of the invention, however, the advantages of both the center-tapped source and the bridge-type inverters may be realized without the disadvantages of either.

It will be understood that the embodiments shown herein are for descriptive purposes only and may be changed or modified without departing from the spirit and scope of the invention as set forth in the appended claims.

What is claimed is:

1. In a polyphase inverter, in combination, DC input means, a plurality of bridge-commutated inverter networks each having first and second output means, means for connecting said inverter networks to said DC input means, firing pulse generating means for controlling the switching activity of said inverter networks, means for connecting said firing pulse generating means to said inverter networks, polyphase transformer means having secondary winding means and first and second electrically isolated primary winding means, means for connecting said first output means to said first primary winding means, means for connecting said second output means to said second primary winding means, AC output means and means for connecting said secondary winding means to said AC output means.

2. In a polyphase inverter, in combination, DC input means, AC output means, a plurality of switching means for producing complementary AC voltages at respective first and second outputs thereof, polyphase firing pulse generating means for controlling the switching activity of said switching means, means for connecting said pulse generating means to said switching means, means for connecting said switching means to said DC input means, polyphase transformer means having secondary winding means and a plurality of electrically isolated sets of primary winding means, means for connecting the first outputs of said switching means to said one set of primary winding means, means for connecting the second outputs of said switching means to another set of primary winding means, and means for connecting said secondary winding means to said AC output means.

3. In a polyphase inverter, in combination, DC input means, AC output means, a plurality of bridge-commutated inverter networks each having first and second output means, means for connecting said inverter networks to said DC input means, polyphase firing pulse generating means, means for connecting said pulse generating means in switching control relationship to said inverter networks, polyphase transformer means including a set of secondary windings and first and second electrically isolated sets of primary windings, means for connecting each winding in said first set of primary windings between the first output means of different inverter networks, means for connecting each winding in said second set of primary windings between the second output means of different inverter networks and means for connecting said set of secondary windings to said AC output means.

4. In a polyphase inverter, in combination, DC source means, a plurality of thyristor bridges each having DC input terminals and AC output terminals, means for connecting said DC input terminals to said DC source means, a plurality of commutating capacitors, means for connecting said commutating capacitors across the AC output terminals of respective thyristor bridges, polyphase firing pulse generating means, means for connecting said pulse-generating means to said thyristor bridges, polyphase transformer means including a plurality of secondary windings and a pluralitY of electrically isolated sets of primary windings, means for connecting each winding in one of said sets of primary windings between corresponding AC output terminals of different thyristor bridges, means for connecting each winding in another of said sets of primary windings between other corresponding terminals of different thyristor bridges, AC output means and means for connecting said secondary windings to said AC output means.

5. In a polyphase inverter, in combination, DC source means, a plurality of thyristor bridges each having DC input terminals and AC output terminals, means for connecting said DC input terminals to said DC source means, a plurality of commutating capacitors, means for connecting said commutating capacitors across the AC output terminals of respective thyristor bridges, polyphase firing pulse generating means, means for connecting said pulse-generating means to said thyristor bridges, a polyphase transformer including a core having plurality of legs, a plurality of secondary windings, a plurality of first primary windings and a plurality of second primary windings, each leg of said core being provided with one secondary winding, one first primary winding and one second primary winding, means for connecting each of said first primary windings between corresponding AC output terminals of different thyristor bridges, means for connecting each of said second primary windings between other corresponding AC output terminals of different thyristor bridges the connecting means for said first and second primary windings being so arranged that the fluxes produced by currents in those primary windings which are located on the same leg of said core are additive, AC output means and means for connecting said secondary windings to said AC output means.

6. In a polyphase inverter, in combination, DC input means, a plurality of thyristor bridges each having DC input terminals and AC output terminals, means for connecting said DC input terminals to said DC input means, a plurality of commutating capacitors, means for connecting said commutating capacitors across the AC output terminals of respective thyristor bridges, polyphase firing pulse generating means, means for connecting said firing pulse generating means to said thyristor bridges, a polyphase transformer having a plurality of primary windings and a plurality of secondary windings, means for connecting the AC output terminals of said thyristor bridges in differentially energizing relationship to said primary windings, AC output means and means for connecting said secondary windings to said AC output means.

7. In a polyphase inverter, in combination, DC source means, a plurality of bridge-commutated inverter networks, means for connecting said DC source means in energizing relationship to said inverter networks, polyphase firing pulse generating means, means for connecting said pulse generating means to said inverter networks, a polyphase transformer having a plurality of primary windings and a plurality of secondary windings, means for connecting said inverter networks in differentially energizing relationship to said primary windings, AC output terminals and means for connecting said secondary windings to said AC output terminals.

8. In a polyphase inverter, in combination, a DC source, a plurality of thyristor bridges each having DC input terminals and AC output terminals, means for connecting said DC input terminals to said DC source, a plurality of commutating capacitors, means for connecting said commutating capacitors across the AC output terminals of respective thyristor bridges, polyphase firing pulse generating means, means for connecting said polyphase firing pulse generating means to said thyristor bridges, a polyphase transformer including a plurality of secondary windings and first and second electrically isolated sets of primary windings, means for connecting together one end of said first primary windings, means for connecting the other end of each of said first primary windings to corresponding AC output terminals of different thyristor bridges, means for connecting together one end of each of said second primary windings, means for connecting the other end of each of said second primary windings to other corresponding terminals of different thyristor bridges, AC output means and means for connecting said secondary windings to said AC output means.

9. In a polyphase inverter, in combination, a DC source, a plurality of thyristor bridges each having DC input terminals and AC output terminals, means for connecting said DC input terminals to said DC source, the plurality of commutating capacitors, means for connecting said commutating capacitors across the AC output terminals of respective thyristor bridges, polyphase firing pulse generating means, means for connecting said pulse-generating means to said thyristor bridges, a polyphase transformer including a core having a plurality of legs, a plurality of secondary windings, a plurality of first primary windings and a plurality of second primary windings, each leg of said core being provided with at least one secondary winding, one first primary winding and one second primary winding, means for connecting one end of each of said first primary winding to the AC output terminal of a respective thyristor bridge, neutral conductor means for connecting together the remaining ends of said first primary windings, means for connecting one end of each of said second primary windings to the remaining AC output terminals of respective thyristor bridges, neutral conductor means for connecting together the other ends of said second primary windings, the primary windings on each leg of said core being connected to different AC output terminals of the same thyristor bridge, AC output means and means for connecting said secondary windings to said AC output means.

10. In a polyphase inverter, in combination, circuit input means, circuit output means, a plurality of switching means for generating AC voltages, said switching means having DC input means and AC output means, polyphase firing pulse generating means for controlling the switching activity of said switching means, means for connecting said pulse generating means to said switching means, means for connecting the DC input means of said switching means to said circuit input means, polyphase transformer means having secondary winding means and a plurality of electrically isolated sets of primary winding means, means for connecting one of the AC output means of each of said switching means to one of said sets of primary winding means, means for connecting another of the output means of each of said switching means to another of said sets of primary winding means, and means for connecting said secondary winding means to said circuit output means.

* * * * *

UNITED STATES PATENT OFFICE
CERTIFICATE OF CORRECTION

Patent No. 3,648,149    Dated March 7, 1972

Inventor(s) Harold J. Brown and Joseph L. Winpisinger

It is certified that error appears in the above-identified patent and that said Letters Patent are hereby corrected as shown below:

Column 1, line 17, change "advantage" to --disadvantage--.

Column 1, line 50, after "turn" insert a comma.

Column 3, line 30, change "vise" to --vice--.

Column 6, line 47, change "tHat" to --that--.

Claim 4, line 10, change "pluralitY" to --plurality--.

Claim 5, line 10, after "having" insert --a--.

Signed and sealed this 25th day of July 1972.

(SEAL)
Attest:

EDWARD M. FLETCHER, JR.    ROBERT GOTTSCHALK
Attesting Officer          Commissioner of Patents